F. O. JAQUES, Jr.
EXPANSION REAMER.
APPLICATION FILED JAN. 5, 1911.

1,005,223.

Patented Oct. 10, 1911.

UNITED STATES PATENT OFFICE.

FERNANDO OSCAR JAQUES, JR., OF CRANSTON, RHODE ISLAND.

EXPANSION-REAMER.

1,005,223.　　　　Specification of Letters Patent.　　Patented Oct. 10, 1911.

Application filed January 5, 1911. Serial No. 601,019.

*To all whom it may concern:*

Be it known that I, FERNANDO OSCAR JAQUES, Jr., a citizen of the United States, residing at Cranston, in the county of Providence and State of Rhode Island, have invented a new and useful Improvement in Expansion-Reamers, of which the following is a specification.

This invention has reference to an improvement in reamers and more particularly to an improvement in expansion reamers.

Expansion reamers as usually constructed are subjected to a torsional strain when in use, which torsional strain tends to and does at times twist the cutting edges or blades of the reamer, thereby reducing the diameter of the reamer and throwing the cutting edges or blades out of true. For these and other reasons the usual form of expansion reamers cannot be used in work requiring accuracy of one one-thousandth of an inch down to one ten thousandths of an inch or less.

The object of my invention is to improve the construction of an expansion reamer, whereby the cutting edges are formed integral with the reamer and locked in the adjusted or expanded position, thereby eliminating torsional strain, giving great accuracy and forming for all practical purposes a solid reamer which cannot, when in use, expand, contract or chatter.

Another object of my invention is to construct an expansion reamer with integral members having one or more cutting edges, central means for uniformly expanding the integral members and cutting edges and circumferential means for locking the integral members and cutting edges in the expanded position.

A further object of my invention is to simplify the construction of an expansion reamer, thereby reducing the cost of manufacturing the same.

My invention consists in the peculiar and novel construction of an expansion reamer having details of construction, as will be more fully set forth hereinafter and claimed.

Figure 1. is a side view of my improved expansion reamer. Fig. 2. is an end view of the reamer. Fig. 3. is a transverse sectional view through the reamer, taken on line 3. 3. of Fig. 1., and Fig. 4. is a longitudinal sectional view taken on line 4. 4. of Fig. 2. through the reamer.

In the drawings 5. indicates the body and 6. the shank of the reamer. The body 5. has the radial slits 7. 7. which extend lengthwise from the working end toward the shank 6. to a predetermined point and divides the body into preferably four equal integral members 8. 8. each integral member 8. having one or more cutting edges 9. 9. of conventional shape and which extend lengthwise of the body as shown in Fig. 1. The body 5. has a central longitudinal hole 10. which the radial slits 7. 7. intersect and has the tapered outer end 11. and a straight screw threaded inner end 12., and a circumferential longitudinal hole 13. for each slit 7. These circumferential longitudinal holes 13. 13. are formed adjacent the circumference of the body, each hole 13. intersecting a slit 7. and formed to have a tapered outer end 14. terminating in a straight inner end 15. which extends through the shank end of the body, as shown in Fig. 4. The tapered end 14. of the hole 13. breaks outward through the body, forming a longitudinal slot 15. as shown in Fig. 1. A central pin 17. having a tapered outer end 18. and a straight screw-threaded inner end 19. is screw-threaded into the end 12. of the central hole 10. and a tapered pin 20. is driven into the tapered ends 14. 14. of each of the circumferential holes 13. 13. as shown in Figs. 2. and 4.

The reamer is expanded to the required diameter, by driving the circumferential pins 20. 20. outward, either by a pin through the ends 15. 15. of the holes 13. 13. or by tapping the pins on the sides through the slots 15. 15. and turning the central pin 18. by the use of a screw-driver or other means. By turning the central pin 18. to the right, the pin is drawn inward and the tapered end 17. on the pin forces the integral members 8. 8. radially and uniformly outward. When the required expansion or size is obtained the circumferential pins 20. 20. are driven inward, preferably simultaneously, thereby locking the integral members 8. 8. and the cutting edges 9. 9. in the expanded positions and forming practically a solid reamer which cannot twist, expand, contract or chatter, when in use.

Having thus described my invention, I claim as new and desire to secure by Letters Patent:—

1. An expansion reamer, comprising a body having a central tapered hole, a plurality of circumferential tapered holes and a plurality of integral parallel expanding members, each expanding member having one or more cutting teeth, a tapered pin in the central tapered hole, a tapered pin in each of the circumferential tapered holes, and means for forcing the central tapered pin inward, whereby the reamer is expanded and locked in the expanded position by driving in the circumferential tapered pins.

2. An expansion reamer, comprising a body having a central tapered hole, terminating in a straight screw-threaded hole, a plurality of circumferential tapered holes and a plurality of integral parallel expanding members having cutting teeth, said integral expanding members being formed by a plurality of radial slits extending from the working end inward and intersecting the central and circumferential holes, a tapered and screw-threaded pin in the central hole and a tapered pin in each of the circumferential holes.

3. An expansion reamer, comprising a body having a central tapered hole terminating in a straight screw-threaded hole, a plurality of circumferential tapered holes terminating in a straight hole, and a plurality of integral expanding members having integral cutting teeth, said expanding members being formed by a plurality of radial slits extending from the working end inward and intersecting the central and circumferential holes, a tapered and screw-threaded pin in the central hole and a tapered pin in each of the circumferential tapered holes.

4. An expansion reamer, comprising a body having a central tapered hole terminating in a straight screw-threaded hole, a plurality of circumferential tapered holes terminating in a straight hole which extends out through the body and a plurality of expanding members having integral cutting teeth, said expanding members being formed by a plurality of radial slits extending from the working end inward and intersecting the central and circumferential holes, a tapered pin screw-threaded into the central tapered hole and a tapered pin in each of the circumferential tapered holes.

5. An expansion reamer, comprising a body having a central hole with a screw-threaded inner end and a tapered outer end, a plurality of circumferential tapered holes terminating in a straight hole which extends out through the body and a slot which extends outward from each of the tapered holes through the body and a plurality of integral expanding members having integral teeth, said integral expanding members being formed by a plurality of radial slits extending from the working end inward and intersecting the central and circumferential holes, a tapered pin screw-threaded into the central tapered hole and a tapered pin in each of the circumferential tapered holes.

6. An expansion reamer, comprising a body, a shank on the body, said body having a central hole with a tapered outer end and a screw-threaded straight inner end, a plurality of circumferential tapered holes having an outwardly extending slot and terminating in a straight hole which extends out through the body and a plurality of expanding members having integral teeth and formed by a plurality of radial slits extending from the working end inward and intersecting the central and circumferential tapered holes, all formed integral, a tapered pin screw-threaded into the central tapered hole and a tapered pin in each of the circumferential tapered holes.

7. An expansion reamer, comprising a round body, a shank on one end of the body, said body having a longitudinal central hole with a tapered outer end and a straight screw-threaded inner end, a plurality of equidistant circumferential tapered holes extending longitudinally and having a longitudinal slot extending outwardly through the body, each circumferential tapered hole terminating in a straight hole which extends out through the shank end of the body and a plurality of expanding members having external longitudinal teeth and formed by a plurality of radial slits extending from the working end inward and intersecting the central and circumferential holes, all formed integral, a tapered pin screw-threaded into the central tapered hole and a tapered pin in each of the circumferential tapered holes.

In testimony whereof, I have signed my name to this specification in the presence of two subscribing witnesses.

FERNANDO OSCAR JAQUES, Jr.

Witnesses:
MICHAEL FISHER,
CHAS. H. LUTHER.